US012771410B2

(12) United States Patent
Lundgren et al.

(10) Patent No.: US 12,771,410 B2
(45) Date of Patent: Oct. 20, 2026

(54) ANTENNA ARRANGEMENT

(71) Applicant: Cellmax Technologies AB, Kista (SE)

(72) Inventors: Johan Lundgren, Storvreta (SE); Daniel Markeborn, Stocksund (SE)

(73) Assignee: Cellmax Technologies AB, Kista (SE)

( * ) Notice: Subject to any disclaimer, the term of this patent is extended or adjusted under 35 U.S.C. 154(b) by 46 days.

(21) Appl. No.: 18/593,933

(22) Filed: Mar. 3, 2024

(65) Prior Publication Data

US 2024/0340043 A1 Oct. 10, 2024

(51) Int. Cl.
*H04B 7/06* (2006.01)
*H01Q 3/30* (2006.01)
*H04B 7/0408* (2017.01)

(52) U.S. Cl.
CPC ............. *H04B 7/0408* (2013.01); *H01Q 3/30* (2013.01); *H04B 7/0615* (2013.01)

(58) Field of Classification Search
None
See application file for complete search history.

(56) References Cited

U.S. PATENT DOCUMENTS 3,872,412 A 3/1975 Seidel
4,616,195 A 10/1986 Ward
10,735,978 B2 8/2020 Barker et al.
11,197,173 B2 12/2021 Barker et al.
11,502,404 B1 * 11/2022 Abdelmonem ........ H01Q 1/246
11,576,585 B2 * 2/2023 Firoozabadi ....... A61B 5/02405
12,218,407 B2 * 2/2025 Lee ........................ H01Q 1/243
2012/0098726 A1 4/2012 Gottl et al.
2015/0207227 A1 7/2015 Iso et al.
2016/0190687 A1 * 6/2016 Shao ........................ H02J 50/27 343/824
2016/0190868 A1 * 6/2016 Shao ..................... H02J 50/402 343/700 MS (Continued)

FOREIGN PATENT DOCUMENTS

CN 107403981 B 8/2018
CN 213878351 U 8/2021

(Continued)

OTHER PUBLICATIONS

PCT/SE2025/050196, International Search Report, Apr. 23, 2025, ISA/SE Patent—och registreringsverket Box 5055 S-102 42 Stockholm, Sweden.

(Continued)

*Primary Examiner* — Wilson Lee
(74) *Attorney, Agent, or Firm* — The Jansson Firm; Pehr B. Jansson

(57) ABSTRACT

Antenna arrangement having an antenna element array including at least two antenna elements spaced apart in a vertical direction of the antenna arrangement, and an antenna feeding network configured to provide signals to the antenna element array to produce a beam. The antenna feeding network may include an input for connection to a radio base station unit, a plurality of outputs connected to a respective antenna element of the array of antenna elements, and a phase delaying arrangement arranged to delay the signals to one or more of the outputs to tilt the beam, wherein the frequency-dependent phase delaying arrangement is configured to delay signals as a function of frequency.

11 Claims, 9 Drawing Sheets

(56) References Cited

U.S. PATENT DOCUMENTS

| | | | | |
|---|---|---|---|---|
| 2018/0261923 | A1* | 9/2018 | Shehan | H01Q 1/241 |
| 2020/0227834 | A1 | 7/2020 | Yman et al. | |
| 2021/0195687 | A1* | 6/2021 | Patel | H01Q 1/246 |
| 2021/0218156 | A1* | 7/2021 | Patel | H01Q 1/246 |
| 2021/0296785 | A1* | 9/2021 | Zimmerman | H01Q 15/08 |
| 2021/0305683 | A1* | 9/2021 | Hou | H01Q 1/246 |
| 2021/0305718 | A1* | 9/2021 | Li | H01Q 5/48 |
| 2021/0320399 | A1* | 10/2021 | Bisiules | H01Q 21/24 |
| 2021/0320413 | A1* | 10/2021 | Wu | H01Q 1/246 |
| 2021/0384606 | A1* | 12/2021 | Kaistha | H01Q 1/246 |
| 2021/0391655 | A1* | 12/2021 | Brobston | H01Q 5/42 |
| 2022/0006177 | A1* | 1/2022 | Wang | H01Q 9/42 |
| 2022/0069452 | A1* | 3/2022 | Li | H01P 1/18 |
| 2022/0149522 | A1* | 5/2022 | Eom | H01Q 21/0006 |
| 2022/0294124 | A1* | 9/2022 | Dolatsha | H01Q 1/48 |
| 2023/0071050 | A1* | 3/2023 | Sun | H01Q 1/246 |
| 2023/0170957 | A1* | 6/2023 | Zimmerman | H04B 7/10 455/101 |
| 2023/0291123 | A1* | 9/2023 | Kasani | H01Q 1/246 |
| 2023/0344113 | A1* | 10/2023 | Zhang | H01Q 1/246 |
| 2023/0352833 | A1 | 11/2023 | Liao et al. | |
| 2024/0006771 | A1* | 1/2024 | Lv | H01Q 19/10 |
| 2024/0047861 | A1* | 2/2024 | Zimmerman | H01Q 3/26 |
| 2024/0145905 | A1* | 5/2024 | Lindmark | H01Q 5/42 |
| 2024/0154296 | A1* | 5/2024 | Chen | H01Q 21/24 |
| 2024/0186711 | A1* | 6/2024 | Li | H01Q 19/108 |
| 2024/0195081 | A1* | 6/2024 | Wu | H01Q 21/062 |
| 2024/0275038 | A1* | 8/2024 | Cho | H01Q 1/46 |
| 2024/0283164 | A1* | 8/2024 | Ai | H01Q 9/44 |
| 2025/0015504 | A1* | 1/2025 | Obermayer | H01Q 25/001 |
| 2025/0167461 | A1* | 5/2025 | Ould-Mohamed | H01Q 9/045 |
| 2025/0183519 | A1* | 6/2025 | Li | H01Q 7/00 |
| 2025/0202087 | A1* | 6/2025 | Manzoni | H01P 1/203 |
| 2025/0253526 | A1* | 8/2025 | Lin Chou | H01Q 3/32 |
| 2025/0253534 | A1* | 8/2025 | Kong | H01Q 9/0428 |
| 2025/0260177 | A1* | 8/2025 | Jang | H01Q 21/062 |
| 2026/0031547 | A1* | 1/2026 | Patel | H01Q 1/246 |

FOREIGN PATENT DOCUMENTS

| | | | |
|---|---|---|---|
| EP | 3125366 | B1 | 2/2020 |
| KR | 1020050071969 | A | 7/2005 |
| KR | 100562227 | B1 | 3/2006 |
| WO | WO2024114879 | A1 | 6/2024 |

OTHER PUBLICATIONS

PCT/SE2025/050196, Written Opinion of the International Searching Authority, Apr. 23, 2025, ISA/SE Patent—och registreringsverket Box 5055 S-102 42 Stockholm, Sweden.

Itu: "Spectrum for IMT", Mar. 8, 2022, pp. 1-2, XP093052412, retrieved from the interset : URL:https://web.archive.org/web/20220308084611if_/https:// [retrieved on Jun. 7, 2023}. https://web.archive.org/web/20220308084611if_/https://.

PCT/EP2022/083437 Written Opinion of the International Searching Authority, European Patent Office P.B. 5818 Patentlan 2 NL-2280 HV Rijswijk—Pays Bas.

* cited by examiner

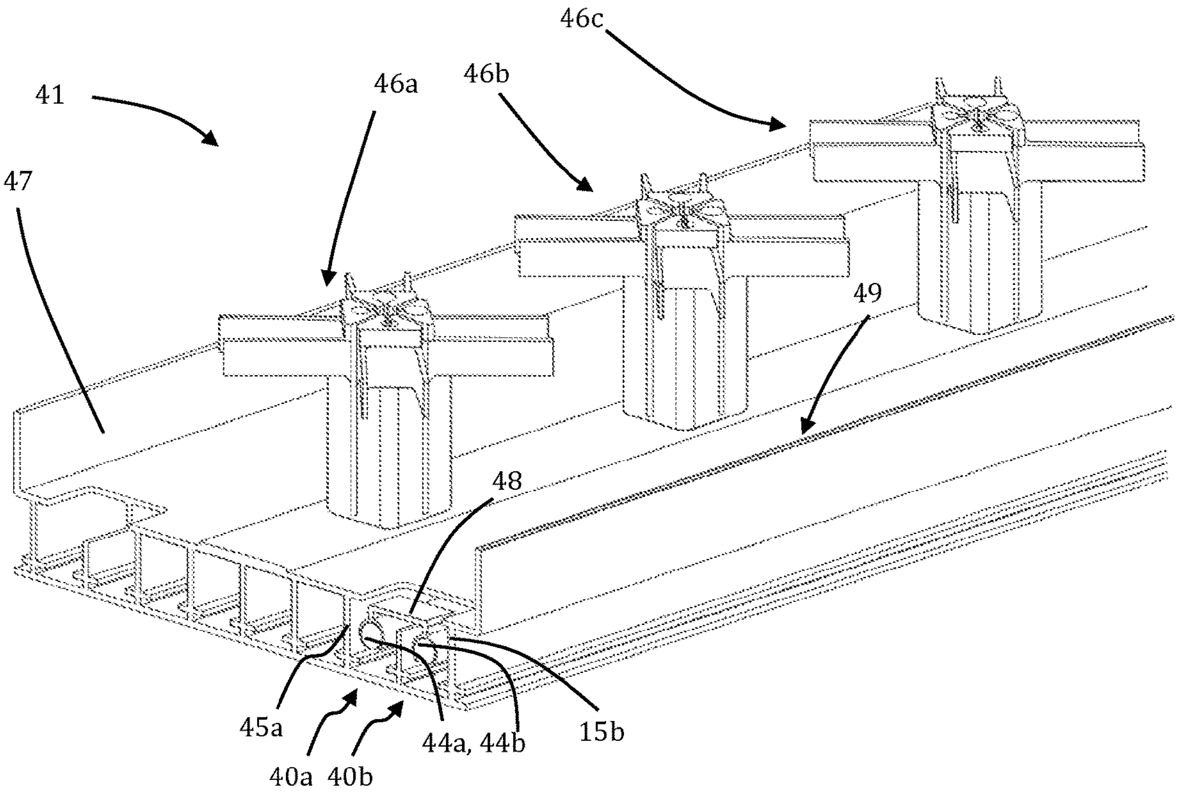
Fig. 9
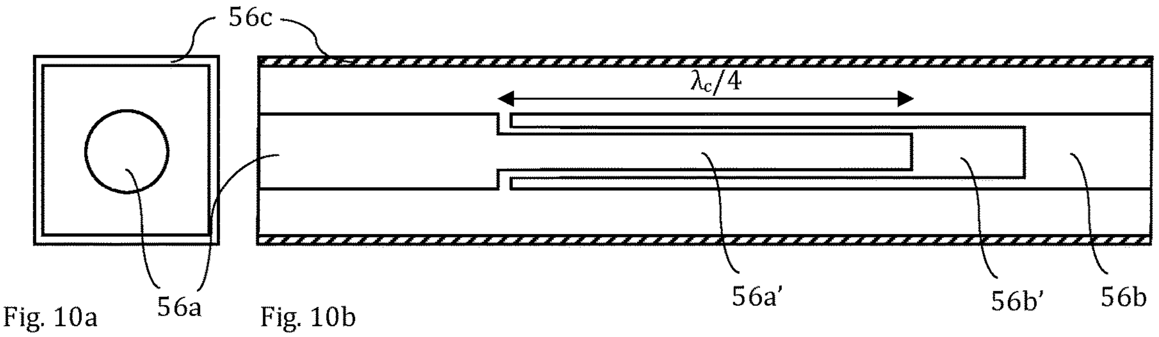
Fig. 10a
Fig. 10b

ANTENNA ARRANGEMENT

TECHNICAL FIELD

The present invention relates to the field of base station antennas for mobile communication.

BACKGROUND

Base station antennas for mobile communication normally comprise an antenna feeding network, a backplane and a plurality of radiating elements (for example dipoles) arranged in front of the backplane. The backplane typically comprises an electrically conductive reflector onto which, or in front of which, the radiating elements are arranged.

Radiating elements are commonly placed as an array in front of the backplane, in some cases as a one-dimensional array (a column) extending in the vertical direction, but two-dimensional arrays are also used.

The purpose of the antenna feeding network is to distribute the signals from a common connector to all radiating elements of an array when transmitting and combining the signals from all the radiating elements to the same common connector when receiving. Such an antenna feeding network can be realized using different types of transmission lines. Transmission lines have a forward path and a return path. Typical transmission lines are flexible coaxial cables using e.g. PTFE as dielectric between inner and outer conductor, or air-filled coaxial lines as disclosed in WO2005/101566A1, U.S. Pat. No. 7,619,580 (which is hereby incorporated by reference in its entirety), or stripline technology with a flat conductor being placed between two ground planes, or microstrip technology using a flat conductor placed over a ground plane, or any other transmission line technology or a combination of the technologies cited above. For a coaxial line, the center conductor is the forward path and the outer conductor is the return conductor. For a stripline or microstrip line, the conductive strip is the forward conductor, and the ground plane(s) the return conductor. In all those cases, it is possible to use a dielectric as e.g. PTFE between the forward conductor and the return conductor, or just air, or a combination of those two. Using essentially air results in significantly lower losses.

Such antennas often use means for setting the elevation angle in order to optimize the performance of a cellular network. Those means include mechanically tilting the antenna, or electrically tilting the antenna beam using phase delay arrangements in the antenna feeding network (electrical downtilt). In the latter case, the electrical downtilt can often be controlled remotely.

As the number of frequency bands used for mobile communication, e.g. as defined by 3GPP, has increased over the years, it has become advantageous to use wideband antennas which can be used for several frequency bands.

However, for wideband antennas, the antenna radiation characteristics, such as elevation beamwidth can be significantly different at one end of the frequency range compared to the other end of the frequency range.

With the introduction of multi-band radios (such as dual- or triple-band radios), the number of array antennas can be reduced since each array antenna can serve several bands simultaneously. But if one feeding network is used for all frequency bands, the same tilt must be used for all bands. This complicates the process of setting a suitable electrical downtilt (EDT) since the different frequency bands have different antenna radiation and propagation characteristics. For example, the 1800 MHz band will have the same EDT as the 2600 MHz band, but the elevation beamwidth at 1800 MHz is approximately 50% wider than at 2600 MHZ.

When cell planning, the EDT is normally set to cover a certain geographical area with sufficiently high signal level, but it is also important to ensure that the spillover into the next cell in front is sufficiently low at all frequencies in order not to cause interference. This is not a problem when adjusting the tilt for each frequency band individually, but with a wideband antenna, the vertical beamwidth is significantly larger at a lower frequency, LrF, than at a higher frequency, HrF. For example, if the EDT is set such that the upper 3 dB points at the higher frequency, HrF, and at the lower frequency, LrF, are within the targeted area/cell it will lead to severe degradation in signal level in the area close to the cell border at HrF, as illustrated in FIG. 1. This is because the elevation beamwidth is narrower and hence the upper 3 dB point is located at a lower elevation angle at HrF than at LrF. This will result in poor signal level close to the cell border, especially as the path loss increases at higher frequencies.

If the EDT on the other hand is set to ensure minimum degradation in the area close to the cell border, for example by setting the EDT such that upper 3 dB point at HrF is at the cell border, the spillover into the next cell will be significant at LrF resulting in interference. This is illustrated in FIG. 2.

The frequency-dependency of the beam peak and the upper 3 dB point of a prior art radiation pattern is illustrated in FIG. 3*a* where the normalized radiation patterns at LrF and HrF as a function of elevation angle are shown. In this example, a 7 degree EDT is used. FIG. 3*b* shows the beam peak direction and the upper 3 dB point as a function of frequency corresponding to the radiation pattern in FIG. 3*a*. As can be seen in FIGS. 3*a* and 3*b*, the 3 dB point at LrF is at a higher elevation angle than the 3 dB point at HrF which means that the antenna provides a larger coverage at LrF than at HrF (as illustrated in FIGS. 1 and 2).

A solution to this problem is to use two or more separate feeding networks connected to the same array of antenna elements, each feeding network having its own EDT control, the signals of the different feeding networks being combined close to the antenna elements using e.g. filters. The problem with such a solution is that the complexity and cost of the antenna are significantly increased, and it will result in significantly higher losses in the feeding networks and the combining filters, resulting in degraded coverage and data throughput.

It is understood that the "upper 3 dB point" referred to above is the point at an upper portion of the main beam where the amplitude is reduced with −3 dB compared to the peak of the main beam.

SUMMARY

An object of the invention is to provide a base station antenna arrangement which overcomes or at least improves on the problems mentioned in the background section.

These and other objects are achieved by the present invention by means of an antenna arrangement and a radio communication antenna according to the independent claims.

According to the invention, an antenna arrangement is provided, which antenna arrangement comprises an antenna element array comprising at least two antenna elements spaced apart in a vertical direction of the antenna arrangement, and an antenna feeding network configured to provide signals to said antenna element array to produce a beam. The antenna feeding network comprises:

- an input for connection to a radio base station unit;
- a plurality of outputs connected to a respective antenna element of the array of antenna elements,
- a phase delaying arrangement arranged to delay the signals to one or more of the outputs to tilt the beam,
- wherein the phase delaying arrangement is configured to delay said signals as a function of the frequency.

In other words, the antenna arrangement comprises an antenna element array having a vertical extension. The antenna element array may also be described as comprising at least a first and a second antenna element, where the first antenna element is positioned above the second antenna element as seen in a height direction of the antenna or reflector or antenna array. The height direction may also be referred to as a vertical direction. The antenna feeding network is configured to provide signals to the antenna element array to produce a beam in the sense that it is configured to distribute signals from the input to the outputs/antenna elements, for example by comprising transmission lines interconnected by splitters. The phase delaying arrangement is arranged to delay the signals to one or more of the outputs to tilt the beam, i.e. to provide an electrical tilt. The phase delaying arrangement is configured to delay the signals as a function of the frequency, i.e. to provide an electrical tilt which varies with frequency.

The invention is based on the insight that by introducing a phase delaying arrangement with a frequency-dependent phase delay in the antenna feeding network and adapting this frequency-dependent phase delay to the desired frequency range of the antenna array, an electrical tilt which is suitable for all frequencies within said frequency range can be achieved. For example, by configuring the phase delay such that lower frequencies are downtilted more than higher frequencies, it is ensured that the signal is focused within the cell and that the spillover to the neighboring cells is sufficiently low. Furthermore, less downtilt at higher frequencies ensures that the signal level is sufficient on the cell borders and in the rest of the cell. The invention should not be confused with conventional phase shifters for adjusting electrical tilt where the goal is usually the opposite-providing an electrical downtilt which is as constant over frequency as possible.

The invention may also be described as antenna arrangement comprising an antenna element array with at least two antenna elements spaced apart in a vertical direction of the antenna arrangement, and an antenna feeding network configured to provide signals to said antenna element array to produce the beam. The antenna feeding network comprises:

- an input for connection to a radio base station unit;
- a plurality of outputs connected to a respective antenna element of the array of antenna elements, and
- a frequency-dependent phase delaying arrangement comprising at least a first phase delaying component connected between said input connection and a first of said at least two antenna elements and a second phase delaying component connected between said input connection and a second of said at least two antenna elements, wherein at least one of the phase delaying components has a frequency dependent phase delay.

Further according to the invention, an antenna feeding network for a radio base station antenna comprising an antenna element array comprising at least two antenna elements spaced apart in a vertical direction is provided. The antenna feeding network is configured to provide signals to the antenna element array to produce a beam, and comprises:

- an input for connection to a radio base station unit;
- a plurality of outputs for connection to a respective antenna element of the array of antenna elements,
- a phase delaying arrangement arranged to delay the signals to one or more of the outputs to tilt the beam,
- wherein said phase delaying arrangement is configured to delay said signals as a function of the frequency.

In embodiments, the antenna element array is configured to transmit and receive signals to and from a cell within a frequency range ranging from a lower frequency, LrF, to a higher frequency, HrF. The phase delaying arrangement is configured to provide said delay as a function of frequency such that an elevation angle associated with a first upper point of reduced amplitude of a main beam radiated from said array at the lower frequency, LrF, is within a predetermined interval from an elevation angle associated with a second upper point of reduced amplitude of a main beam radiated from said array at said higher frequency, HrF, the first and second upper points of reduced amplitude being of equally reduced amplitude relative a beam peak of the respective main beam. The predetermined interval may be ±2 degrees, or ±1 degree, or ±0.5 degrees. The equally reduced amplitude may be within an interval from −10 dB to −1 dB, or within an interval from −6 dB to −2 dB, or within an interval from −3.5 dB to −2.5 dB relative a beam peak of the respective main beam. In a preferred embodiment, the equally reduced amplitude is −3 dB relative the beam peak of the respective main beam (the "upper 3 dB points"), i.e. the first and second upper points of reduced amplitude are the "upper 3 dB points", and the predetermined interval is ±1 degree.

In embodiments, the phase delaying arrangement is configured to provide the delay as a function of frequency such that in normalized radiation patterns from said array radiated at LrF and HrF, respectively, a main beam associated with LrF crosses a main beam associated with HrF at respective upper points of reduced amplitude which are within an interval from −10 dB to −1 dB, or within an interval from −6 dB to −2 dB, or within an interval from −3.5 dB to −2.5 dB relative a beam peak of the respective main beam. For example, the main beam associated with LrF may cross/coincide with the main beam associated with HrF at upper points of reduced amplitude of −2 dB or −3 dB (the "upper 3 dB points").

In embodiments, the phase delay decreases with increased frequency such as to provide less electrical downtilt with increased frequency (at least within the frequency range of the antenna array). The phase delay may be described as a progressive phase delay between respective antenna elements in the array, starting from the topmost element. The progressive phase delay may decrease approximately linearly with increased frequency.

In embodiments, the phase delaying arrangement, or more specifically, the at least one phase delaying component having a frequency-dependent phase delay, comprises one or more components selected from the following list:

- reactive components or transmission lines of different impedances;
- at least one transmission line acting as an open or closed stub;
- transmission lines being capacitively and/or inductively coupled to each other.

The one or more components is/are configured to act on the phase of signals being transmitted through said phase delaying arrangements.

In embodiments, the phase delaying arrangement, or more specifically, the at least one phase delaying component having a frequency-dependent phase delay, comprises a filter configured to provide said phase delay as a function of frequency. The filter may have an all-pass, a low-pass, high-pass, band-stop, or band-pass characteristic. The non-linear phase response in a filter can be tailored to get the desired phase delay. Filters can be realized in an antenna feeding network by means of overlapping regions (of inner conductors of a coaxial line or stripline for example) which behave as a series capacitance on the inner conductor, which alters the phase delay differently at lower frequencies compared to higher frequencies. By varying the length of the overlapping region, the difference in phase delay between lower and higher frequencies can be optimized.

In embodiments, the phase delaying arrangement comprises signal splitters configured to split one incoming signal to a least a first output and a second output, wherein the signal splitters are configured to provide a difference in phase delay at said first output and said second output which varies with frequency. The signal splitters may be part of the antenna feeding network for splitting signals from an input transmission line to two output transmission lines. The two output transmission lines can have different impedances and thus form two phase delaying components with different phase delay. As a person skilled in the art would know, such splitters split power unequally between the two outputs and are often used in phased array antennas to taper the antenna lobe to break the symmetrical pattern of the antenna pattern with significant sidelobes and deep nulls in the antenna diagram.

In embodiments, the antenna feeding network comprises transmission lines comprising at least one of a coaxial line, a stripline, a microstrip line or a combination thereof, the phase delaying arrangement being formed at least partly by at least one of said transmission lines or being arranged to co-act with at least one of said transmission lines. The at least one of the transmission lines may comprise at least one pair of conductors separated by air, or a dielectric material such as PTFE, or a combination thereof, acting as dielectric.

In embodiments, the phase delaying arrangement is configured to vary the phase delay of the signals such as to control the (electrical) tilt of the beam. The frequency dependency of the phase delay may be variable, i.e. the phase delay may be varied differently for different frequencies. The phase delaying arrangement may comprise means for varying the phase delay manually. Alternatively, the phase delaying arrangement may comprise means for varying said phase delay remotely, i.e. in a corresponding manner as a RET.

In embodiments, the antenna arrangement/antenna feeding network further comprises an electrical tilt adjustment arrangement configured to provide variable phase adjustment such as to adjust an overall electrical tilt of the beam. The electrical tilt adjustment arrangement may be configured to adjust said overall electrical tilt in a substantially non-frequency dependent manner. This allows the overall electrical tilt of the antenna to be adjusted. Such embodiments comprising an electrical tilt adjustment arrangement with a phase delay substantially non-dependent on frequency may be combined with a frequency dependent phase delaying arrangement. In embodiments, the frequency dependent tilt of the phase delaying arrangement is constant/non-adjustable, whereas the non-frequency dependent tilt of the electrical tilt adjustment arrangement can be used to adjust the overall tilt (for all frequencies) of the antenna. Electrical tilt adjustment is described in detail in applicant's previous application WO2009041896, U.S. Pat. No. 8,576,137 (which is hereby incorporated by reference in its entirety).

In embodiments, both frequency independent and frequency dependent phase delays can be set remotely. This allows the tilt to be set individually at both LrF and HrF, Further according to the invention, a radio communication antenna is provided. The radio communication antenna comprises an input for connection to a transmit-receiver unit, and a reflector or backplane which may be described as having a lower end and an upper end defining a height direction therebetween. An antenna element array is positioned on or in front of said reflector, the array comprising at least first and second antenna elements. The first antenna element is positioned above the second antenna element as seen in the height direction, i.e. the antenna element array comprises at least two antenna elements spaced apart in the height/vertical direction. The antenna elements are configured to transmit and receive signals within a frequency range comprising at least two frequency bands. A first of said at least two frequency bands is located in a lower part of the frequency range, and a second of said at least two frequency bands is located in a higher part of the frequency range, i.e. the first frequency band is at a lower frequency range than the second frequency band. A feeding network is configured to distribute a signal from the input to the antenna elements to produce a beam, the feeding network comprising at least one phase delayer. The phase delayer(s) is/are configured to electrically tilt the antenna beam in said first frequency band with a first tilt angle, and to tilt the antenna beam in said second frequency band with a second tilt angle, the first tilt angle being different from the second tilt angle.

It is understood that the first tilt angle and the second tilt angle are representative tilt angles (such as mean tilt angles) for the respective frequency band and are not necessarily constant within the respective frequency band. The phase delayer(s) may alternatively be described as being configured to electrically tilt the antenna beam in said first frequency band with tilt angles within a first interval, and to tilt the antenna beam in said second frequency band with tilt angles within a second interval, the first and second interval being different such as non-overlapping.

In embodiments, the first tilt may be more downwardly directed than the second tilt.

In embodiments, at least one of said first or second tilt is a downtilt. In embodiments where the first and second tilts are downtilts, the first tilt angle is larger than said second tilt angle.

In embodiments, the phase delayers are configured to delay signals from the input to the antenna elements, wherein signals to the first antenna element are delayed with a first phase delay, and signals to the second antenna element are delayed with a second phase delay, the second phase delay being larger than the first phase delay. A difference between the first phase delay and said second phase delay may be a function of the frequency. The difference between the first phase delay and the second phase delay may be larger in the first frequency band than in said second frequency band. Put differently, the signals to the first antenna element are delayed with a first phase delay, and the next-coming antenna elements are delayed progressively, i.e., a second phase delay being larger than the first phase delay, a third phase delay being larger than the second phase delay, and so forth.

In embodiments, the antenna may be configured to cover a certain geographical area, where said geographical area is essentially the same for said first frequency band and at least the second frequency band. In other words, the coverage at the first frequency band may correspond to the coverage at the second frequency band. The geographical area may be a cell in a cellular network. To achieve essentially the same coverage, the phase delayers may be configured to provide the delay as a function of frequency such that an elevation angle associated with a first upper point of reduced amplitude of a main beam radiated from said array at a first frequency within said first frequency band is within a predetermined interval from an elevation angle associated with a second upper point of reduced amplitude of a main beam radiated from said array at a second frequency within said second frequency band, the first and second upper points of reduced amplitude being of equally reduced amplitude relative a beam peak of the respective main beam. The predetermined interval may be ±2 degrees, or ±1 degree, or ±0.5 degrees (i.e. the predetermined interval is between 2 degrees below the elevation angle to 2 degrees above the elevation angle, or 1 degree below the elevation angle to 1 degree above the elevation angle, or 0.5 degree below the elevation angle to 0.5 degree above the elevation angle). The equally reduced amplitude may be within an interval from −10 dB to −1 dB, or within an interval from −6 dB to −2 dB, or within an interval from −3.5 dB to −2.5 dB relative a beam peak of the respective main beam. The first and second upper points of reduced amplitude may be −3 dB relative the beam peak of the respective main beam (the "upper 3 dB points", i.e. the equally reduced amplitude is −3 dB), and the predetermined interval may be ±1 degree. Hereinbelow, the notation ±x is used to indicate an interval from v−x to v+x where v is a reference value, e.g., elevation angle associated with an upper point of reduced amplitude of main beam or a particular frequency, and ±x is a deviation above or below v.

To achieve essentially the same coverage, it is also foreseeable that the phase delayers are configured to provide a delay as a function of frequency such that in normalized radiation patterns from said array radiated at first and second frequencies within said first and said second frequency band, respectively, a main beam associated with the first frequency crosses a main beam associated with the second frequency at respective upper points of reduced amplitude which are within an interval from −10 dB to −1 dB, or within an interval from −6 dB to −2 dB, or within an interval from −3.5 dB to −2.5 dB relative a beam peak of the respective main beam. For example, the main beam associated with the first frequency may cross/coincide with the main beam associated with the second frequency at upper points of reduced amplitude of −2 dB or −3 dB (the "upper 3 dB points")

Further according to the invention, a method for optimizing a cellular mobile network is provided. The cellular mobile network is configured to transmit and receive in at least two frequency bands using an antenna configured to operate over a frequency range comprising the at least two frequency bands, wherein a first of said at least two frequency bands is located in a lower frequency range of said antenna, and where a second of said at least two frequency bands is located in a higher frequency range of said antenna, the antenna providing an antenna lobe. The method comprises configuring an electrical downtilt of the antenna such that the downtilt at said first frequency band is larger than the downtilt at said second frequency band. The method may further comprise configuring the electrical downtilt such that a coverage at said first frequency band corresponds to a coverage at said second frequency band. The configuring may comprise configuring a frequency dependent delay characteristic of the electrical downtilt such that an elevation angle associated with a first upper point of reduced amplitude of a main beam radiated from said array at a first frequency within said first frequency band is within a predetermined interval from an elevation angle associated with a second upper point of reduced amplitude of a main beam radiated from said array at a second frequency within said second frequency band, the first and second upper points of reduced amplitude being of equally reduced amplitude relative a beam peak of the respective main beam. The predetermined interval may be ±2 degrees, or ±1 degree, or ±0.5 degrees. The upper points of reduced amplitude may be within an interval from −10 dB to −1 dB, or within an interval from −6 dB to −2 dB, or within an interval from −3.5 dB to −2.5 dB relative a beam peak of the respective main beam. The upper points of reduced amplitude may both be −3 dB relative the beam peak of the respective main beam (the "upper 3 dB points"), and the predetermined interval may be ±1 degree.

Alternatively, the configuring may comprise configuring a frequency dependent delay characteristic of the electrical downtilt such that in normalized radiation patterns from said array radiated at first and second frequencies within said first and said second frequency band, respectively, a main beam associated with the first frequency crosses a main beam associated with the second frequency at respective upper points of reduced amplitude which are within an interval from −10 dB to −1 dB, or within an interval from −6 dB to −2 dB, or within an interval from −3.5 dB to −2.5 dB relative a beam peak of the respective main beam. For example, the main beam associated with the first frequency may cross/coincide with the main beam associated with the second frequency at upper points of reduced amplitude of −2 dB or −3 dB (the "upper 3 dB points").

The features of the embodiments described above are combinable in any practically realizable way to form embodiments having combinations of these features. In particular, features and advantages of embodiments of the antenna arrangement may form corresponding embodiments with corresponding advantages of the radio communication antenna or method according to the invention and vice versa. Further, features and advantages of embodiments of the radio communication antenna may form corresponding embodiments with corresponding advantages of the method according to the invention.

BRIEF DESCRIPTION OF THE DRAWINGS

Above discussed and other aspects of the present invention will now be described in more detail using the appended drawings, wherein:

FIG. 9 schematically illustrates an embodiment of an antenna arrangement according to the invention;

FIG. 10*a* is an end view of a frequency dependent phase delaying arrangement of the embodiment in FIG. 8;

FIG. 10*b* is a side cross sectional view of the phase delaying arrangement in FIG. 10*a;*

DETAILED DESCRIPTION

Figure 1:
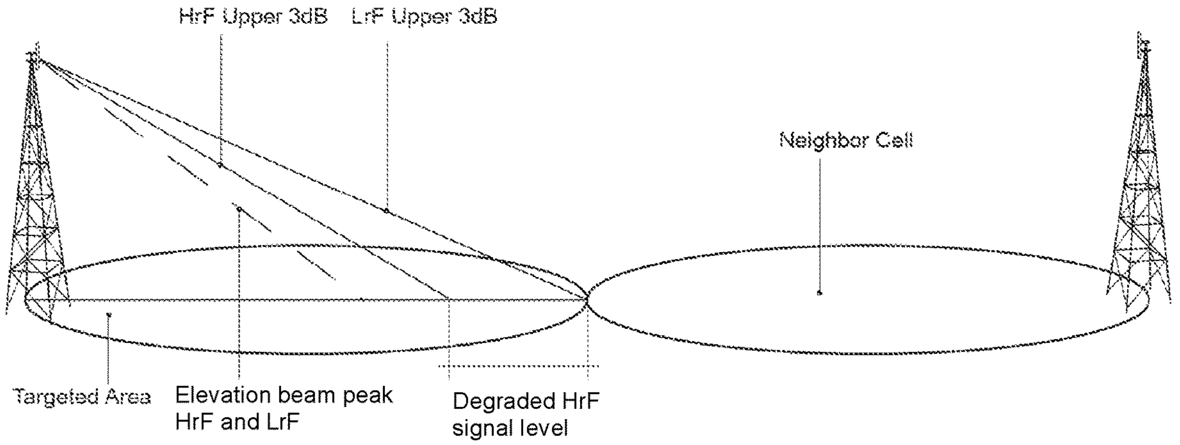
Fig. 1 (Prior art)
FIG. 1 illustrates cell coverage of a prior art antenna arrangement with EDT set such that the upper 3 dB points at the higher frequency, HrF, and at the lowest frequency, LrF, are within the targeted area/cell.
Figure 2:
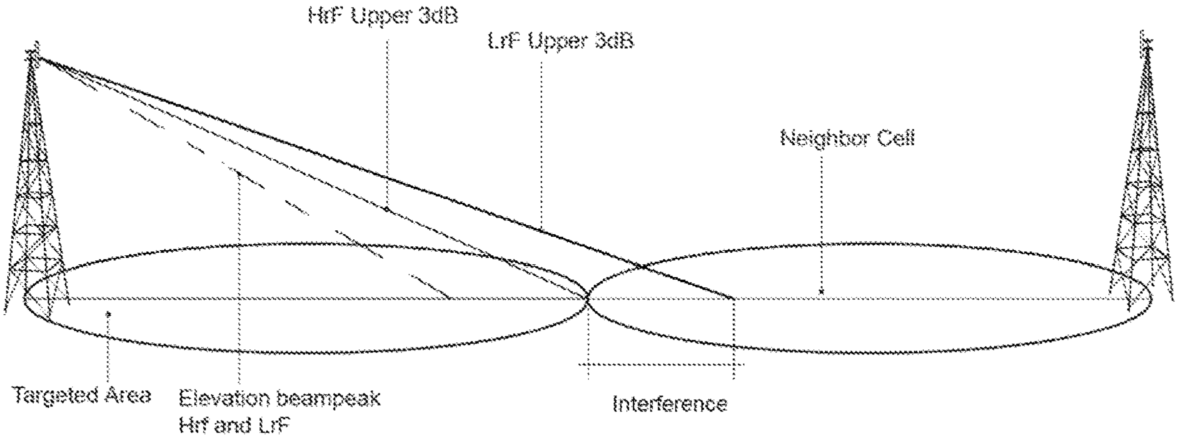
Fig. 2 (Prior art)
FIG. 2 illustrates cell coverage of a prior art antenna arrangement with EDT set to achieve full coverage within the targeted area/cell at the LrF and HrF.
Figure 3A:
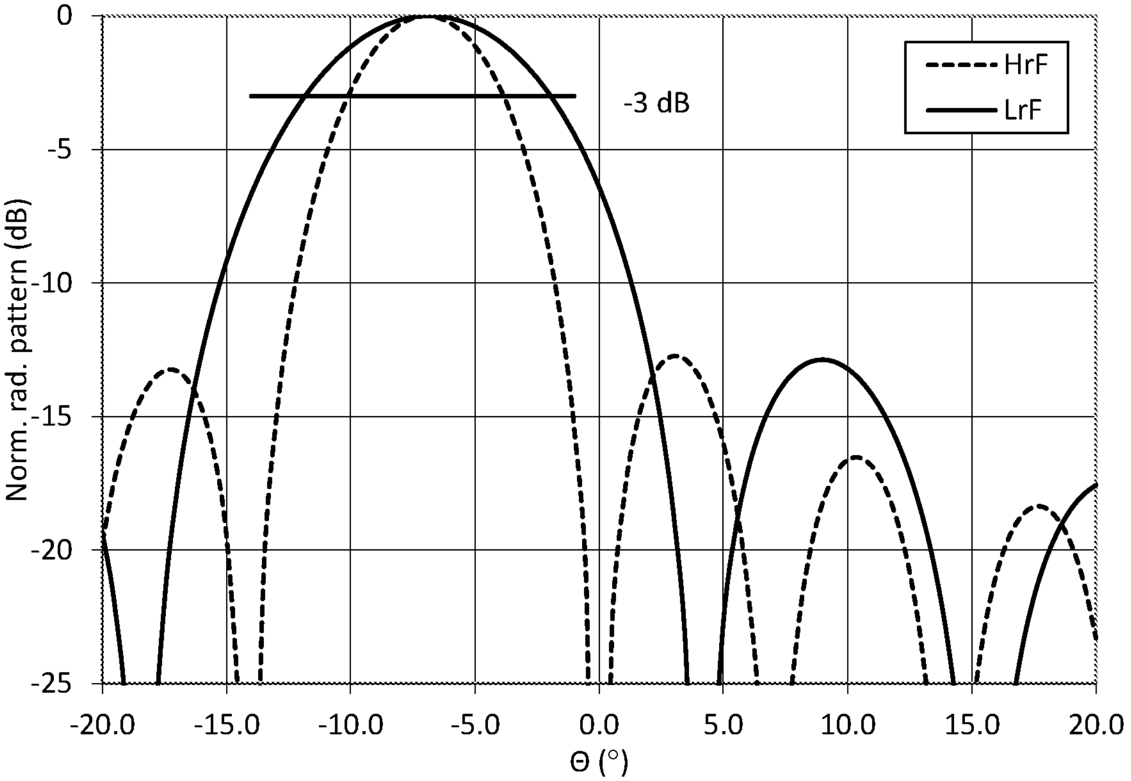
Fig. 3a (Prior art)
FIG. 3*a* shows a prior art radiation pattern where the normalized radiation patterns at LrF and HrF as a function of elevation angle are shown.
Figure 3B:
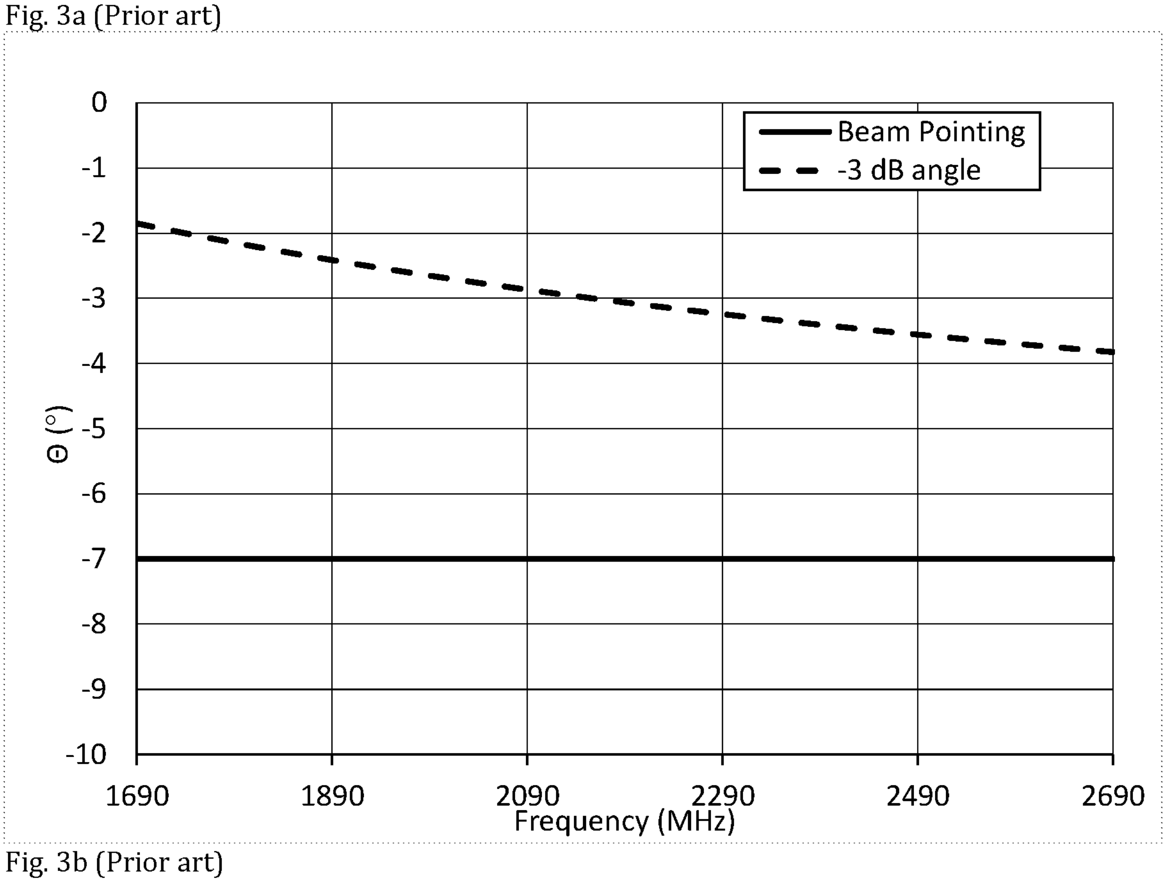
Fig. 3b (Prior art)
FIG. 3*b* shows the beam peak direction and the upper 3 dB point as a function of frequency corresponding to the radiation pattern in FIG. 3*a;*

FIG. 1-3 illustrate cell coverage and radiation pattern of a prior art antenna arrangement. These figures are discussed further in the above Background section.

Figure 4:
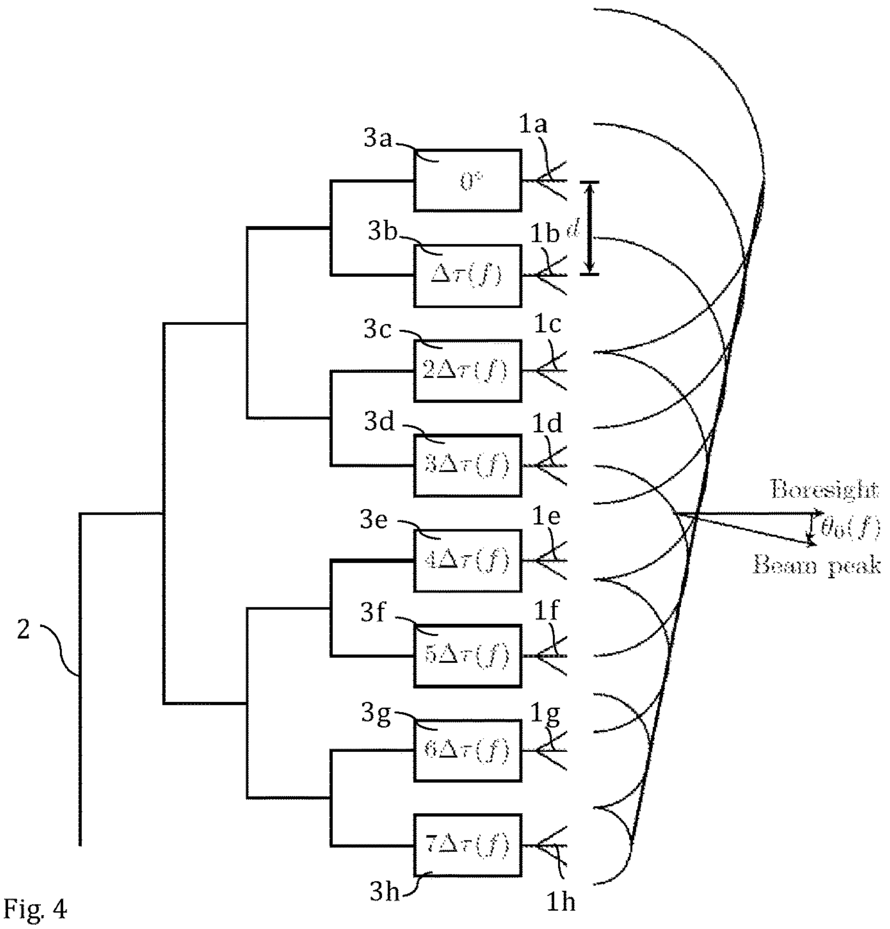
FIG. 4 schematically illustrates an embodiment of the antenna arrangement according to the invention.

FIG. 4 schematically illustrates an embodiment of the antenna arrangement according to the invention where the antenna arrangement is provided with a progressive phase delay between each consecutive antenna elements in the sense that phase delay relative the antenna element at the top of the array increases by $\Delta\tau(f)$ with each consecutive antenna element to $7\Delta\phi(f)$ at the bottom of the array.

The progressive phase delay is given by:

$$\Delta\tau(f) = \frac{\Delta\phi(f)}{2\pi f}$$

where $\Delta\phi(f)=kd \sin \theta_0(f)$,
and k is the wavenumber in free space, and d is the antenna element spacing, and $\theta_0(f)$ is the beam peak direction at frequency f. The wavenumber in free space would be recognized by a person skilled in the art as $k=\omega/c$, where $\omega=2\pi f$, and c=speed of light.

The antenna arrangement comprises eight antenna elements 1*a-h* spaced apart in a vertical direction of the antenna arrangement, and an antenna feeding network configured to provide signals to said antenna element array to produce a beam. The antenna feeding network comprises an input 2 for connection to a radio base station unit, a plurality of outputs connected to a respective antenna element 1*a-h* of the array of antenna elements. A phase delaying arrangement comprising phase delaying components 3*a-h* is arranged to phase delay the signals to the outputs of antenna elements 1*b-h* to tilt the beam. The phase delaying components are connected between the input 2 and a respective antenna element. The phase delaying property of the phase delaying components differ in the sense that they provide a different amount of phase delay. For example, 3*c* provides twice the phase delay compared to 3*b*. The phase delaying arrangement is configured to delay said signals as a function of the frequency. The phase delay decreases approximately linearly with increased frequency such as to provide less electrical downtilt with increased frequency. The beam peak direction in FIG. 4 is frequency dependent and is more downtilted at LrF than at HrF.

It should also be understood that connections between the input 2 and the phase delaying components 3*a*-3*h* may also provide phase delay, but this phase delay may be the same between the input 2 and each phase delaying components 3*a*-3*h*, and hence not influence the beam peak direction. Such phase delay can be caused by transmission lines of equal length and equal impedance.

All phase delaying components may provide a combination of a constant phase delay and a progressive phase delay, such that for example the total phase delay provided by phase delaying component 3*b* would be:

$$\tau(f) = \tau_0 + \Delta\tau(f)$$

where $\tau_0$ is the constant phase delay.

The signal at antenna element 1*a* is used as a reference, and hence phase delaying component 3*a* will only provide the constant phase delay $\tau_0$. For simplicity, only $\Delta\tau(f)$ is used in the figures.

A person skilled in the art recognizes that the above-described frequency dependent phase delay stands in sharp contrast with prior art antennas with the same beam peak direction for all frequencies, where $\Delta\tau$ should not vary with frequency.

Figure 5A:
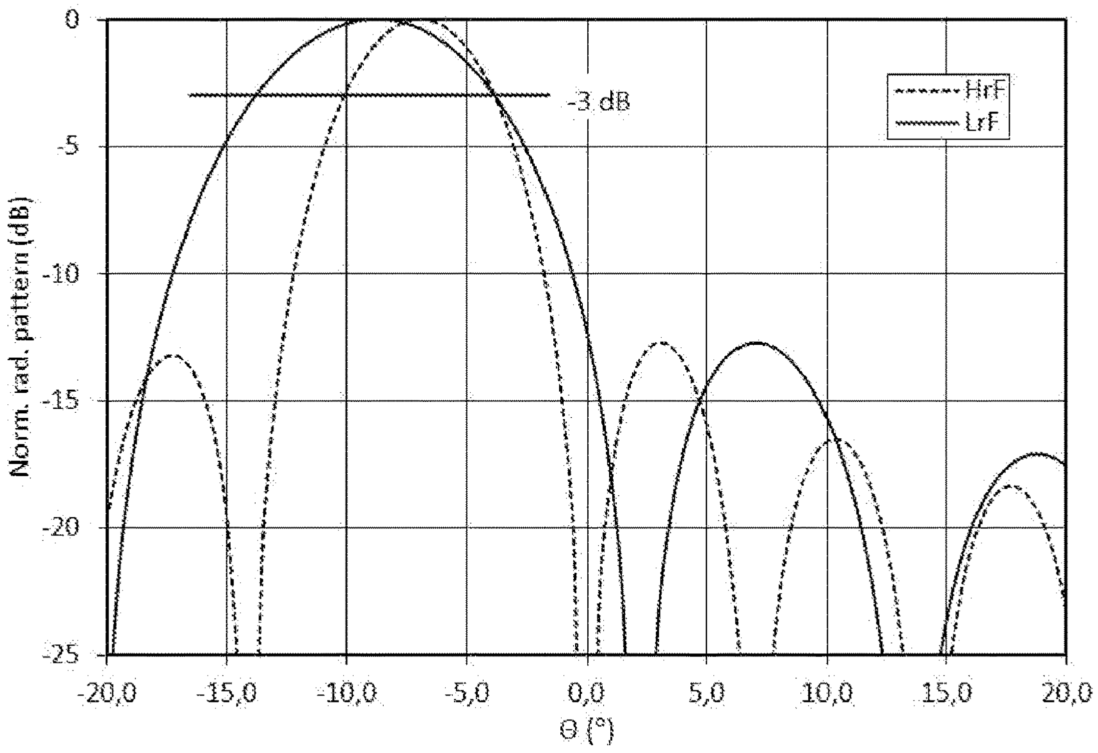
FIG. 5*a* shows a radiation pattern of an embodiment of the antenna arrangement according to the invention, where the normalized radiation patterns at LrF and HrF as a function of elevation angle are shown.

FIG. 5*a* shows a radiation pattern of an embodiment of the antenna arrangement according to the invention, for example, as produced by an antenna arrangement as illustrated in FIG. 4, where the normalized radiation patterns at LrF and HrF as a function of elevation angle ($\theta$) are shown.

According to the invention, an elevation diagram with frequency-dependent beam peak is proposed, as shown in FIG. 5*a*. Instead of aligning the radiation patterns in the beam peak angle at all frequencies as in the prior-art case shown in FIG. 3, the radiation patterns are instead aligned in the upper 3 dB point as the −3 dB line indicates in FIG. 5*a*. This overcomes the challenges of finding a suitable EDT for all frequencies. The progressive phase delay $\Delta\tau(f)$ is calculated using the difference between the upper 3 dB points at LrF and HrF in FIG. 3*b*.

Having a perfect alignment of upper 3 dB points of all frequencies, e.g., LrF and HrF, as illustrated in FIG. 5*a* is not necessary for achieving the objectives of providing a strong signal for all frequencies throughout a cell without undue interference in adjoining cells. Thus, the delaying arrangement is configured to provide frequency dependent delay such that the main lobes of radiated frequencies are aligned within a desired predefined interval. For example, in a preferred embodiment, the delaying arrangement is configured to align an elevation angle associated with a predetermined (first) upper point of reduced amplitude of a main beam radiated from said array at a first frequency within said first frequency band to within a predetermined interval from an elevation angle associated with a corresponding (second) upper point of reduced amplitude of a main beam radiated from said array at a second frequency within said second frequency band. The first and second upper points of reduced amplitude are of equally reduced amplitude relative a beam peak of the respective main beam. The predetermined interval may be, for example, ±2 degrees, or even narrower, such as ±1 degree or ±0.5 degree.

Similarly, while aligning the 3 dB points at different frequency band can be optimal in a certain geographical environment, in a different environment it might be advantageous to align other points of reduced amplitude. These reduced amplitude lines may, for example, be selected from within the range −10 dB to −1 dB relative to the beam peak.

Figure 5B:
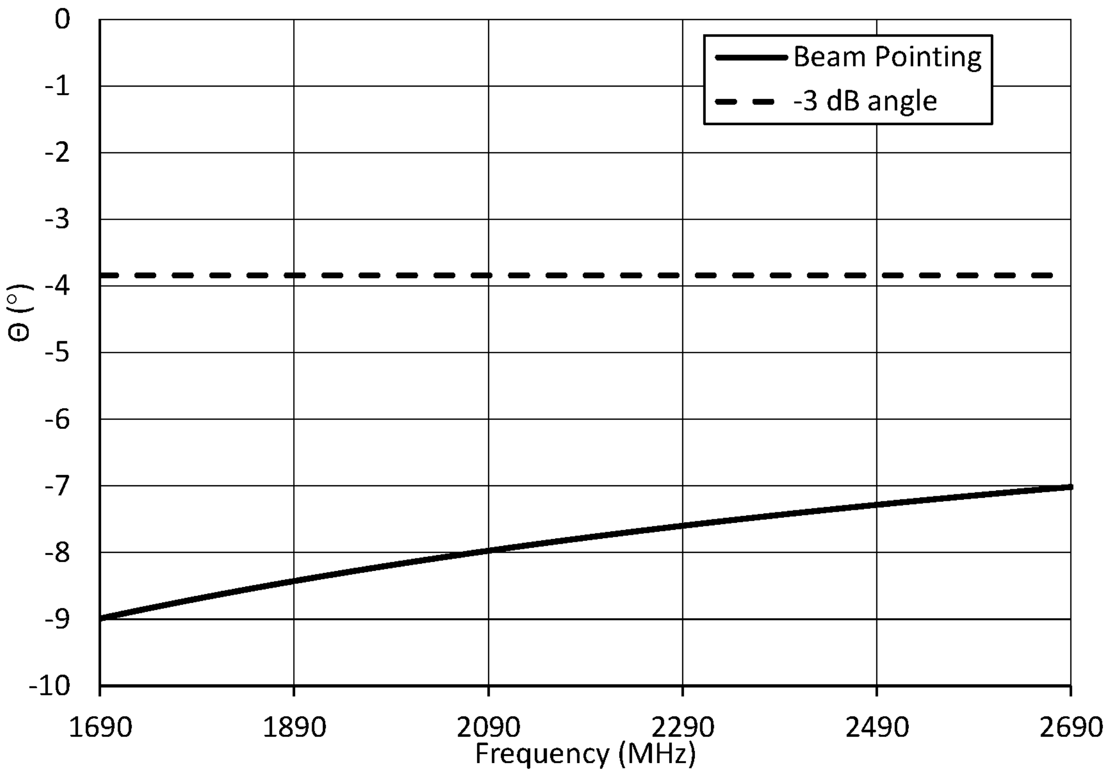
FIG. 5*b* shows the beam peak direction and the upper 3 dB point as a function of frequency corresponding to the radiation pattern in FIG. 5*a;*
Figure 6:
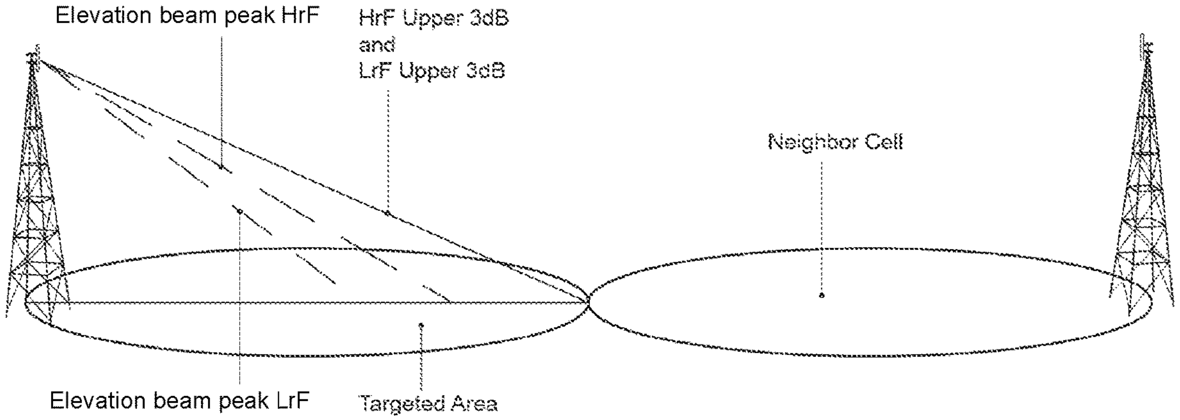
FIG. 6 illustrates cell coverage of an embodiment of the antenna arrangement according to the invention.

FIG. 5*b* shows the beam peak direction and the upper −3 dB angle/direction as a function of frequency corresponding to the radiation pattern in FIG. 5*a*. As can be seen in FIG. 5*b*, the upper −3 dB angle is constant whereas the beam peak is more downtilted at lower frequencies than at higher frequencies. This ensures that the signal is focused within the cell and that the spillover to the neighboring cells is sufficiently low to avoid undue interference. Furthermore, the higher frequencies are less downtilted to ensure that the signal level is sufficient on the cell borders and in the rest of the cell. This is also illustrated in FIG. 6.

Figure 5C:
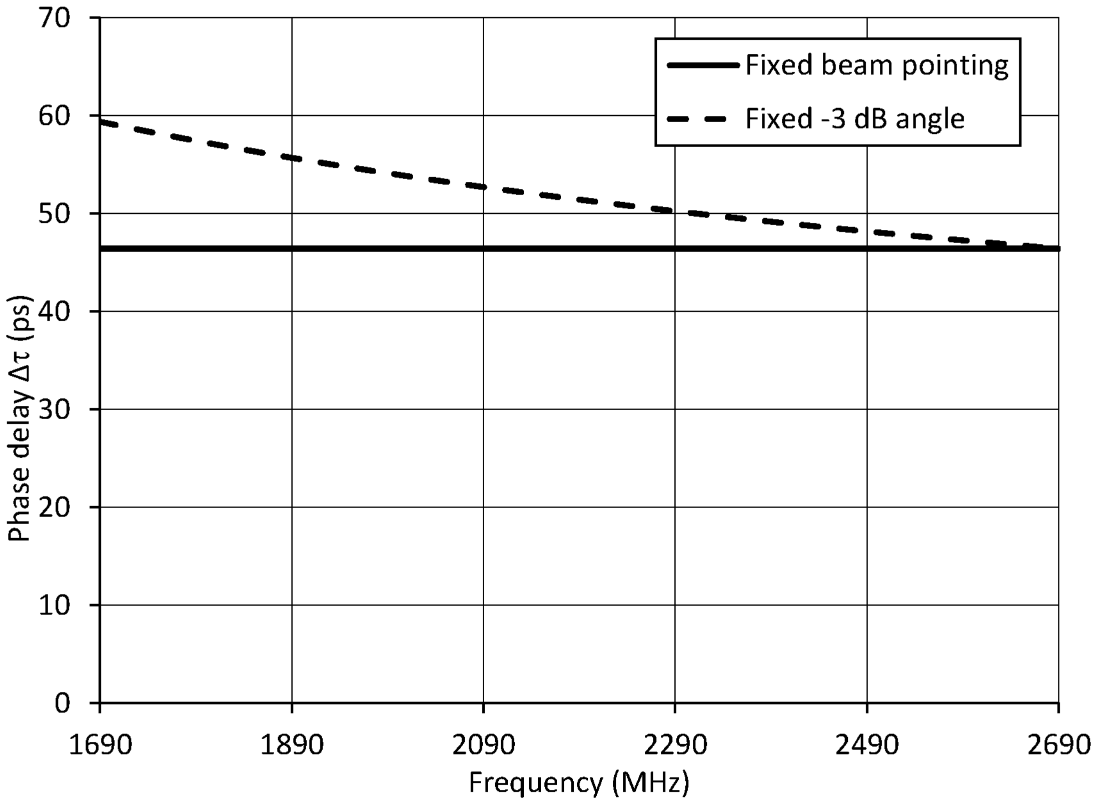
FIG. 5*c* shows prior art (fixed beam pointing) phase delay and phase delay according to an embodiment of the invention (fixed-3 dB angle), the phase delay being defined between two radiating elements in an antenna element array (progressive phase delay) as a function of frequency.

FIG. 5*c* shows prior art (fixed beam pointing) progressive phase delay and progressive phase delay according to an embodiment in the invention (fixed −3 dB angle) as a function of frequency. The progressive phase delay $\Delta\tau(f)$ is defined as the difference between two consecutive radiating elements in an antenna element array in a progressive manner, starting from the topmost element. The solid line shows the (constant) phase delay in a prior art antenna arrangement (fixed beam pointing, i.e. the beam peak angle/direction is the same for all frequencies) and the dotted line shows the frequency-dependent phase delay in an embodiment of the antenna arrangement according to the invention. As can be seen in FIG. 5*c*, the progressive phase delay provided by the invention is greater at lower frequencies compared to higher frequencies, i.e. the beam is more downtilted at lower frequencies.

To realize the proposed radiation pattern in FIG. 5*a*, a frequency-dependent progressive phase delay between each antenna element is required.

As known by a person skilled in the art, the phase delay $\Delta\tau(f)$ between the antenna elements can be achieved with different configurations. Two different configurations are shown in FIG. 7*a-b*.

Figure 7A:
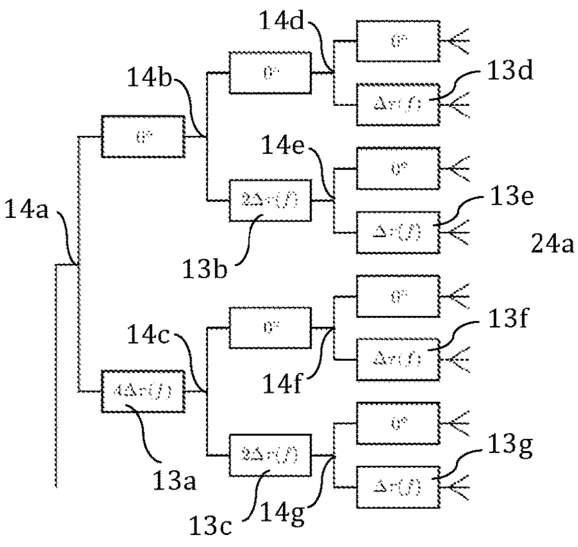
FIG. 7*a-b* schematically illustrates two different embodiments of the antenna arrangement according to the invention.

The antenna arrangement embodiment in FIG. 7*a* comprises a phase delaying arrangement comprising phase delaying components 13*a-g* distributed in the antenna feeding network to achieve the same phase delay as in FIG. 4. Phase delaying components 13*d-g* provide the same phase delay, whereas 13*b-c* provide twice the phase delay of 13*d-g* and 13*a* provides four times the phase delay of 13*d-g*. The phase delaying components are arranged at a lower output of a respective splitter 14*a-g* such that the phase delay increases with each consecutive antenna element as seen from above to achieve a downtilt in the same manner as in FIG. 4. Further, since the phase delay is greater at lower frequencies than at higher frequencies, the downtilt is greater at lower frequencies. As can be seen in FIG. 7*a*, each antenna element is connected to the inlet via at least one phase delaying component. In a corresponding manner as explained above with reference to FIG. 4, the components marked 0° are also phase delaying components, but differ from phase delaying components 13*a-g* in that they provide a constant (non-frequency-dependent) delay.

Figure 7B:
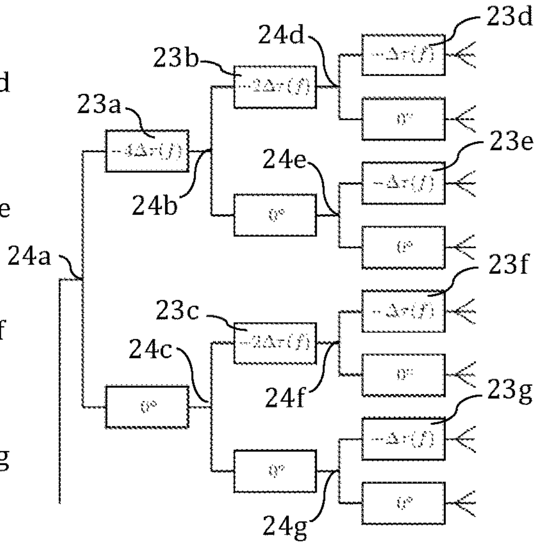

The antenna arrangement embodiment in FIG. 7*b* comprises phase delaying components distributed in the antenna feeding network in an alternative manner, but also achieves the same phase delaying as in FIG. 4. The phase delaying components 23*a-g* differ from those in FIG. 7*a* in that they provide a phase delay which increases with increased frequency, hence the negative signs ($-\Delta\tau(f)$ for example). But, since the phase delaying components are arranged at an upper output of a respective splitter 24*a-g*, the progressive phase delay at higher frequencies decreases with each consecutive antenna element as seen from above, i.e., the beam is thus tilted upwards more at higher frequencies than at lower frequencies which thus means that the beam has more downtilt at lower frequencies. A corresponding phase delay as in FIG. 4 can thus be achieved. As can be seen in FIG. 7*b*, each antenna element is connected to the inlet via at least one phase delaying component. The components marked 0° are also (constant) phase delaying components, as explained above with reference to FIG. 7*a*.

As known by a person skilled in the art, what matters in a phased array antenna is the difference in phase delay between the different radiators. And it can be seen that for the three configurations in 4, 7*a* and 7*b*, the phase of the signals arriving to the radiators will have the same delay, that is there is a progressive increase of phase delay $\Delta\tau(f)$ between two neighbour radiators from the upper radiator to the lower radiator.

Figure 8:
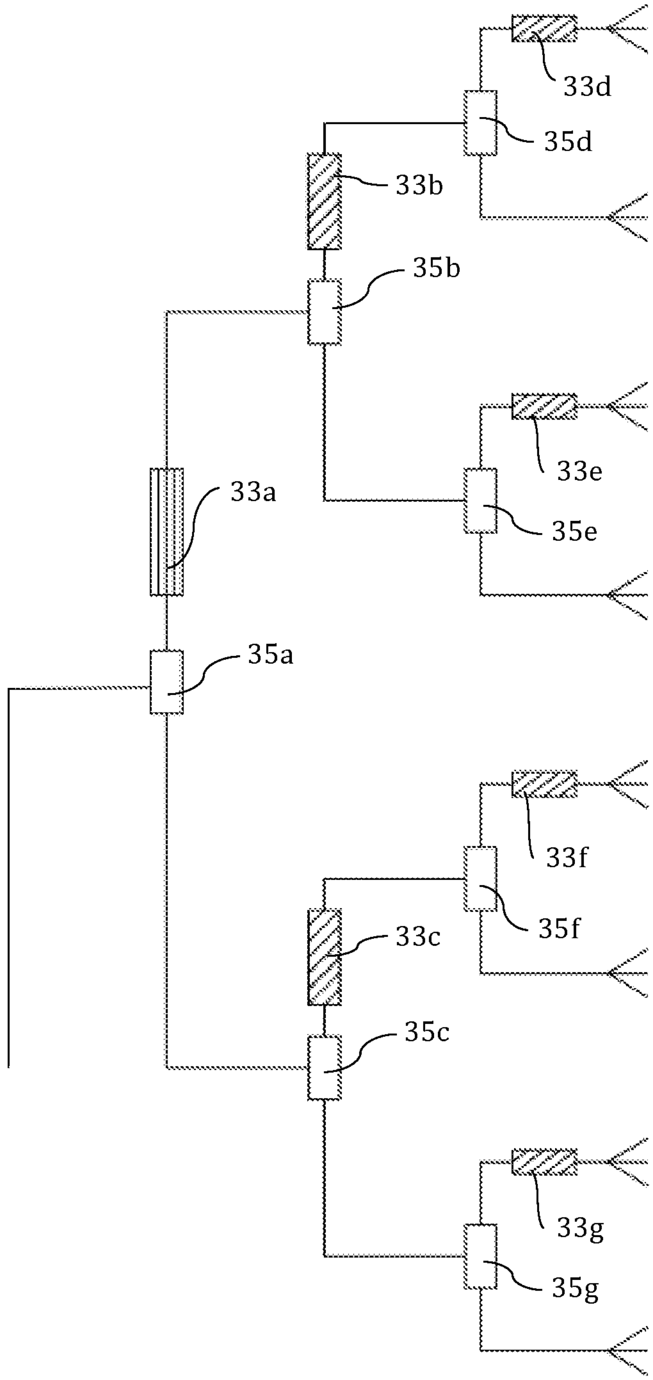
FIG. 8 schematically illustrates a realization of an embodiment similar to that in FIG. 7*b* with the addition of adjustable electrical tilt.

FIG. 8 schematically illustrates a realization of the embodiment in FIG. 7*b* with the addition of (frequency independent) electrical tilt by means of the splitters 24*a-g* having been replaced by electrical tilt phase shifting components 35*a-g* of the type described in for example the applicant's previous application WO2009041896 (referred to as phase shifters therein). These phase shifting components provide phase delays which are independent of frequency and together form an electrical tilt adjustment arrangement. In this embodiment, each antenna element is connected to the inlet via at least one phase delaying component, but the lowermost antenna element is solely connected via components providing frequency-independent phase delay (phase shifting components 35*a*, 35*c* and 35*g*).

The electrical tilt phase shifting components 35*a-g* can be adjusted remotely (RET) by using rail elements carrying the dielectric elements of 35*a-g*, which rails are displaceable using electric motor(s), as described for example in applicant's previous application WO2017048184, US Pat. Publ. U.S. Pat. No. 20190044226A1 (which is hereby incorporated by reference in its entirety).

The phase delaying components 23*a-g* in FIG. 7*b* are implemented as high-pass filters 33*a-g*. All of the high-pass filters provide a phase delaying characteristic which increases with increased frequency. The phase delaying component 33*a* provides twice the phase delay of phase delaying components 33*b* and 33*c*, which in turn provide twice the phase delay of phase delaying components 33*d-g*. The transmission lines in FIG. 8 are illustrated as lines, but it is understood that they are implemented as air-filled coaxial lines (as shown in WO2009041896 and WO2017048184).

FIG. 9 schematically illustrates an embodiment of an antenna arrangement 41 according to the invention. The antenna arrangement is shown with three cross-polarized antenna elements 46*a-c*, and first and second coaxial lines 40*a-b*, but it is understood that it can be provided with further antenna elements and coaxial lines such as to implement the antenna arrangement in FIG. 8. The first coaxial line 40*a* comprises a first central inner conductor 44*a*, an elongated outer conductor 45*a* forming a cavity or compartment around the central inner conductor, and the corresponding second coaxial line 40*b* having a second inner conductor 44*b* and an elongated outer conductor 45*b*. The outer conductors 45*a*, 45*b* have rectangular cross sections and are formed integrally and in parallel to form a self-supporting structure. The wall which separates the coaxial lines 40*a*, 40*b* constitute vertical parts of the outer conductors 45*a*, 45*b* of both lines. The first and second outer conductors 45*a*, 45*b* are formed integrally with the reflector 49 in the sense that the upper and lower walls of the outer conductors are formed by the front side 47 and the back side of the reflector, respectively. In FIG. 9, not all longitudinal channels or outer conductors are illustrated with inner conductors, it is however clear that they may comprise such inner conductors. The front side 47 of the reflector comprises at least one opening for the installation of a connector device 48 connecting the inner conductors 44*a* and 44*b*.

Figure 12:
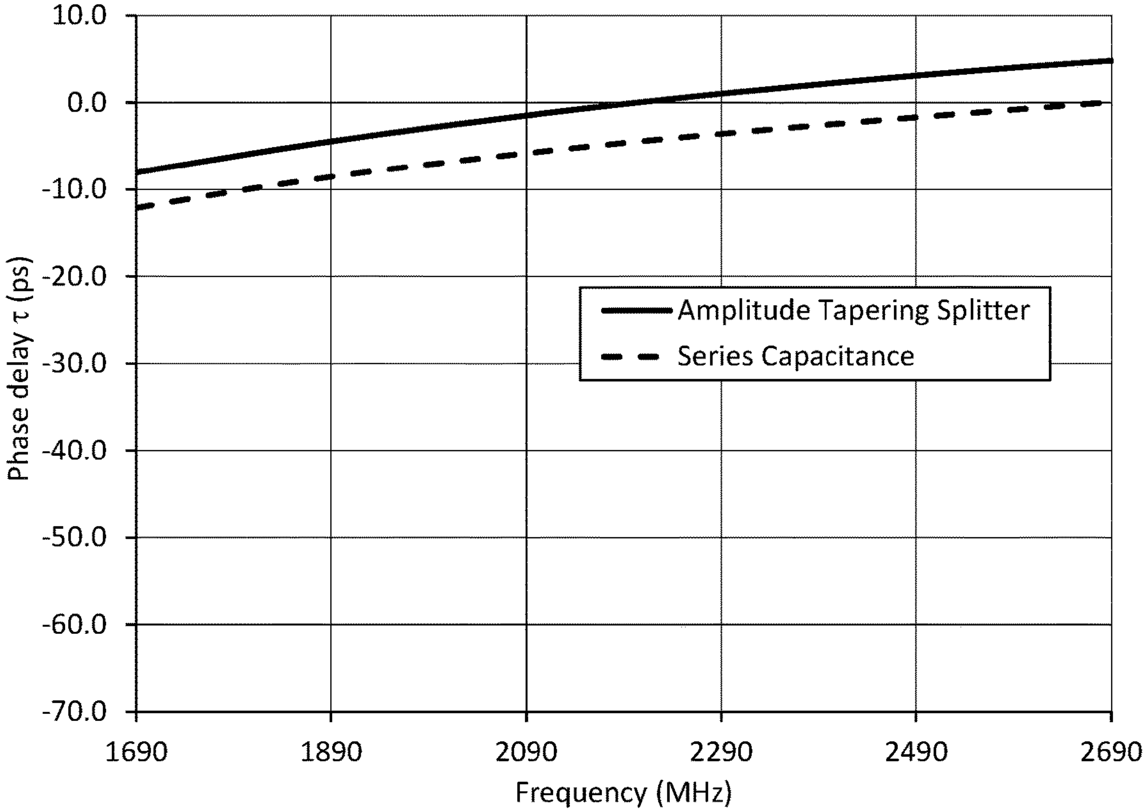
FIG. 12 shows the phase delay of the frequency dependent phase delaying arrangement of FIGS. 10*a* and 10*b* (Series Capacitance) and the difference in phase delay as a function of frequency between the two output ports of the embodiment in FIG. 11 (Amplitude Tapering Splitter), and FIG. 13 schematically illustrates a realization of an embodiment similar to that in FIG. 8 with the main difference being that the splitters are of the frequency dependent phase delay type shown FIG. 11.

FIG. 10*a* is an end view of a frequency dependent phase delaying component of the embodiment in FIG. 8, and FIG. 10*b* is a side cross sectional view of the phase delaying component in FIG. 10*a*. Each of the phase delaying components 33*a-g* in FIG. 8 may be formed by filters as shown in FIG. 10*a-b*, either configured differently to achieve the desired different phase delays of 33*a-g* or with two or more filters being arranged serially to provide the greater phase delay of 33*a-c*. The phase response in the high-pass filter is tailored to get the desired phase delay. The high-pass filters are realized in an air-filled coaxial line feeding network (such as the one shown in FIG. 9), with FIG. 10*a-b* showing a high-pass filter formed as parts (longitudinal portions) 56*a*, 56*b* of an inner conductor and a part (longitudinal portion) of an outer conductor 56*c* of the antenna feeding network. The inner conductor is formed as two inner conductor portions 56*a*, 56*b* with a first inner conductor portion 56*a* being formed with a cylindrical (rod-shaped) protrusion 56*a*' at an end thereof, the protrusion having a smaller diameter than the rest of the first inner conductor portion 56*a*, the cylindrical protrusion being partly arranged in a cavity/recess 56*b*' of a second inner conductor portion 56*b* such as to achieve a capacitive coupling therebetween. The overlapping region between 56*a*' and 56*b*' thus behaves as a series capacitance on the inner conductor which alters the phase delay differently at lower frequencies compared to higher frequencies. By varying the length of the overlapping region, the difference in phase delay between lower and higher frequencies can be optimized. The overlap is illustrated as about $\lambda_c/4$, where $\lambda_c$ is the wavelength at the center frequency of the range, but could be from $\lambda_c/10$ to $\lambda_c$. FIG. 12 ("Series Capacitance") shows the difference in phase delay between the capacitance formed by the arrangement in FIG. 10*a* and a 50 ohm transmission line of equal length. This arrangement acts as a high pass filter, and as is known by a person skilled in the art, the phase delay in such a filter decreases with decreasing frequency, unlike the phase delay of the corresponding 50 ohm line, which is frequency independent.

Varying the length and the separation distance of the overlapping region, and thereby altering the phase delay at lower frequencies compared to higher frequencies is used in one embodiment to control the tilt of the beam. The adjustment may be performed manually or using electro-mechanical components, the adjustment can be performed remotely.

Figure 11:
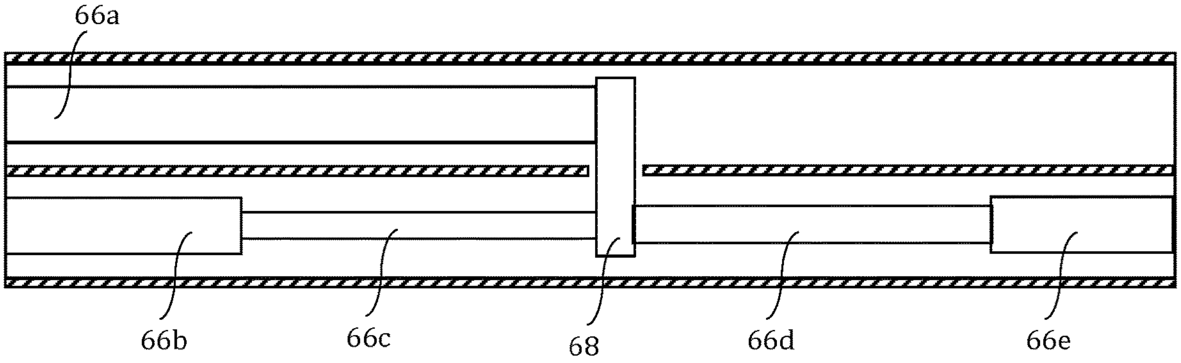
FIG. 11 schematically illustrates a signal splitting portion of an antenna feeding network forming (part of) a phase delaying arrangement.

FIG. 11 schematically illustrates a cross sectional view of part of an antenna feeding network (of the same air-filled coaxial type shown in FIG. 9) as seen from the front of the antenna arrangement, the cross section being taken below and parallel to the reflector front side (corresponding to 47 in FIG. 9) such that the inner conductors are visible. An inner conductor portion 66*a* forming an input port is connected to another inner conductor 66*b-e* using a connector device 68 (corresponding to 48 in FIG. 9). The other inner conductor comprises first and second output port portions 66*b* and 66*e* and portions 66*c* and 66*d* of different diameters such as to achieve amplitude tapering and different phase delay to the two ports 66*b*, 66*e*. As a person skilled in the art would know, such splitters are often used in phased array antennas to taper the antenna lobe to break the symmetrical pattern of the antenna pattern with significant sidelobes and deep nulls in the antenna diagram. Typically, it is required that the first upper lobe is reduced to a maximum (again to prevent from spillover and interference in the neighbor cell) and that the first null is significantly reduced. The difference in phase delay between the signal propagating from 66*a* to 66*e*, compared to the signal propagating from 66*a* to 66*b* in FIG. 11 is shown in FIG. 12 ("Amplitude tapering splitting"). In the middle of the frequency range, approximately 2190 MHZ, the phase delay to 66*b* and 66*e* are equal, i.e. the difference is zero. However, at lower frequencies, the phase delay to 66*b* is larger than the phase delay to 66*e*. Furthermore, at higher frequencies, the phase delay to 66*e* is larger than the phase delay to 66*b*. The two methods for tailoring the phase delay described in FIGS. 10*a* and 11 can be combined to achieve the required frequency dependent phase delay. Other arrangements can also be used. The antenna feeding network parts shown in FIG. 11 can be described as including two phase delaying components with frequency dependent phase delay, where inner conductor portion 66*c* (co-acting with the outer conductor) forms a first phase delaying component and inner conductor portion 66*d* (co-acting with the outer conductor) forms a second phase delaying component.

Figure 13:
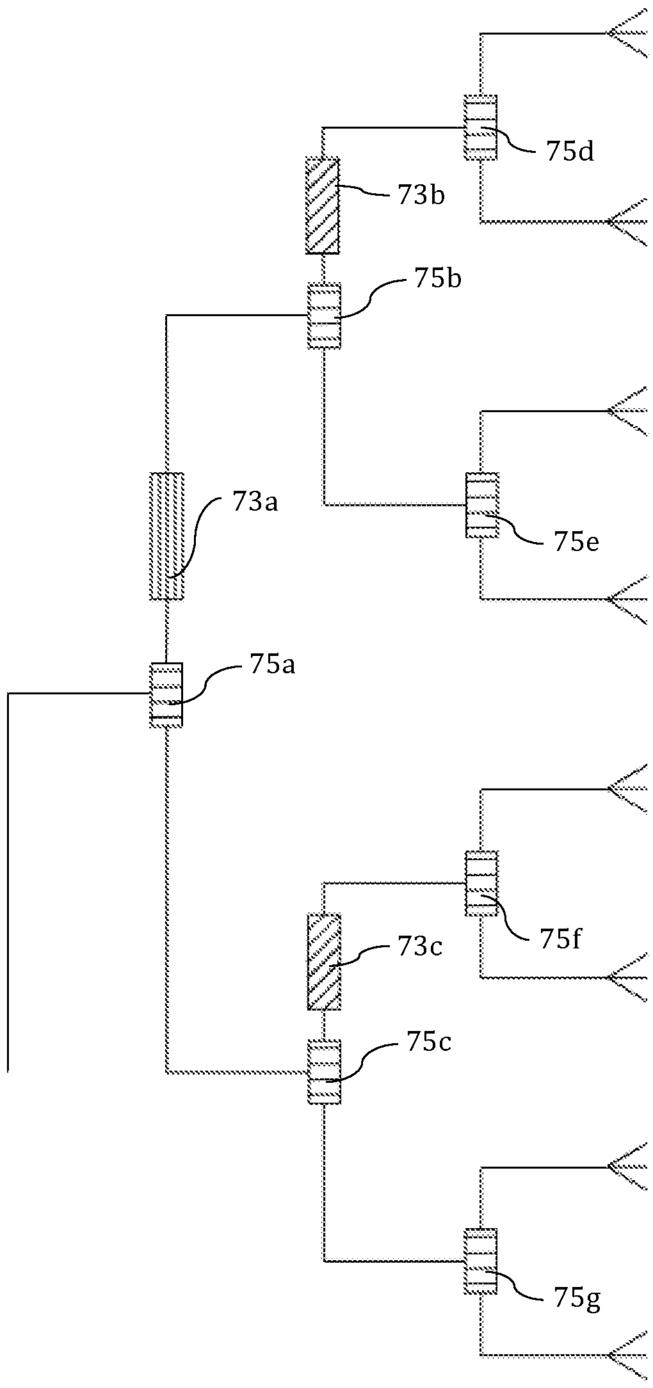

FIG. 13 schematically illustrates a realization of an embodiment similar to that in FIG. 8 with the main difference being that the splitters 75*a-g* are of the frequency dependent phase delay type shown FIG. 11 and whose phase delay characteristic is shown in FIG. 12. The phase delaying components 73*a-c* are implemented as high-pass filters of the same type shown in FIG. 10*a-b*. The splitters 75*d-g* with frequency dependent phase delay however removes the need for high-pass filters corresponding to 33*d-g* in FIG. 8 since a corresponding difference in phase delay is achieved by means of the phase delayers themselves (see FIG. 12). Furthermore, the frequency dependent phase delay provided by splitters 75*a-c* means that the filters 73*a-c* need to provide less phase delay than the corresponding filters 33*a-c* in FIG. 8. Some or all of the splitters 75*a-g* can also be combined with electrical tilt phase shifting components of the type described in for example the applicant's previous application WO2009041896 to achieve remote electrical tilt by using rail elements carrying the dielectric elements of 35*a-g*, which rails are displaceable using electric motor(s), as described for example in applicant's previous application WO2017048184. In this embodiment, each antenna element is connected to the inlet via at least one phase delaying component having a frequency-dependent phase delay. It is noted that the two lowermost antenna elements are connected to the input via frequency-dependent phase delaying components formed by (parts of) splitters 75$c$ and 75$g$ as described above with reference to FIG. 11. This embodiment thus generates the same type of progressive phase delay between each consecutive antenna elements as in FIG. 4.

Herein, implementations using air coaxial lines have been described, but phase delays can also be created using other types of transmission lines such as partially open coaxial lines, stripline, microstrip lines or any other type of transmission lines.

The description above and the appended drawings are to be considered as non-limiting examples of the invention. The person skilled in the art realizes that several changes and modifications may be made within the scope of the invention. For example, the frequency dependent downtilt illustrated in FIG. 4 can be implemented by other combinations of phase delaying components and placements in feeding networks that have the same or similar behavior on the radiation pattern. For example, phase delaying components described hereinabove using high-pass filters. In alternative embodiments, the phase delaying components may be implemented as all-pass, low-pass, band-stop, or band-pass filters. The scope of protection is determined by the appended patent claims.

The invention claimed is:

1. A radio communication antenna comprising:

an input for connection to a transmit-receiver unit, a reflector having a lower end and an upper end defining a height direction therebetween, an antenna element array being positioned on or in front of said reflector, the array comprising at least first and second antenna elements, the first antenna element being positioned above the second antenna element as seen in the height direction, the antenna elements being configured to transmit and receive signals to a cell within a frequency range comprising the at least two frequency bands, wherein a first of said at least two frequency bands is located in a lower part of the frequency range, and wherein a second of said at least two frequency bands is located in a higher part of the frequency range, a feeding network configured to distribute a signal from the input to the antenna elements to produce a beam, said feeding network comprising phase delayers, wherein said phase delayers are configured to electrically tilt the antenna beam in said first frequency band with a first tilt angle, and to tilt the antenna beam in said second frequency band with a second tilt angle, the first tilt angle being different from the second tilt angle.

2. The antenna according to claim 1, wherein at least one of said first or second tilt is a downtilt.

3. The antenna according to claim 2, wherein said first tilt angle is larger than said second tilt angle.

4. The antenna according to claim 3, where said phase delayers are configured such that a signal coming from the input will be delayed when arriving at the antenna element, signals arriving to the first antenna element having a first phase delay, and signal arriving to the second antenna element having a second phase delay, said second phase delay being larger than said first phase delay, and wherein the difference between said first phase delay and said second phase delay is a function of the frequency.

5. The antenna according to claim 4, wherein said difference between said first phase delay and said second phase delay is larger in said first frequency band than in said second frequency band.

6. The antenna according to claim 5, said antenna being configured to cover a certain geographical area, where said geographical area is essentially the same for said first and second frequency bands.

7. The antenna according to claim 6, where said geographical area is a cell in a cellular network.

8. The antenna according to claim 4, wherein said phase delayers are configured to provide a phase delay as a function of frequency such that an elevation angle associated with a first upper point of reduced amplitude of a main beam radiated from said array at a first frequency within said first frequency band is within a predetermined interval from an elevation angle associated with a second upper point of reduced amplitude of a main beam radiated from said array at a second frequency within said second frequency band, the first and second upper points of reduced amplitude being of equally reduced amplitude relative to a beam peak of the respective main beam.

9. The antenna according to claim 8, wherein said predetermined interval is ±2 degrees, or ±1 degree, or ±0.5 degrees with respect to the elevation angle.

10. The antenna according to claim 8, wherein said equally reduced amplitude is within an interval from −10 dB to −1 dB relative to a beam peak of the respective main beam.

11. The antenna according to claim 4, wherein said phase delayers are configured to provide a phase delay as a function of frequency such that in normalized radiation patterns from said array radiated at first and second frequencies within said first and said second frequency band, respectively, a main beam associated with the first frequency crosses a main beam associated with the second frequency at respective upper points of reduced amplitude which are within an interval from −10 dB to −1 dB, or within an interval from −6 dB to −2 dB, or within an interval from −3.5 dB to −2.5 dB relative to a beam peak of the respective main beam.

* * * * *